July 21, 1953
I. KALIKOW ET AL
2,646,519
DYNAMOELECTRIC MACHINE CLUTCH AND BRAKE
Filed Sept. 30, 1950
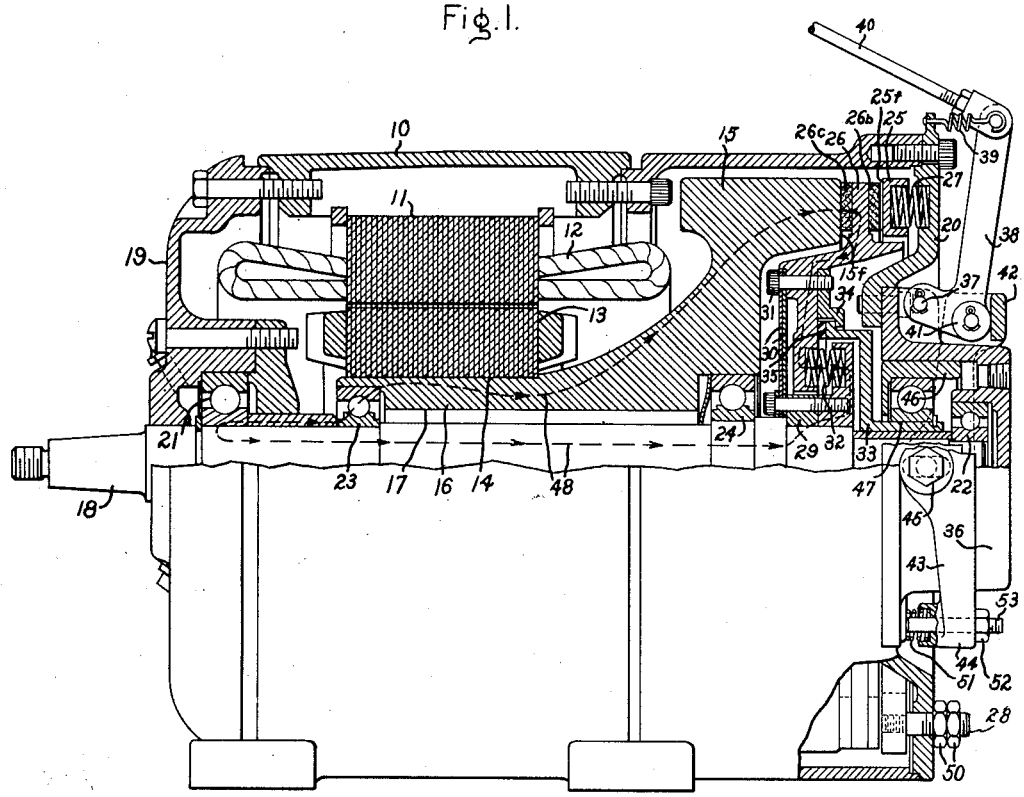
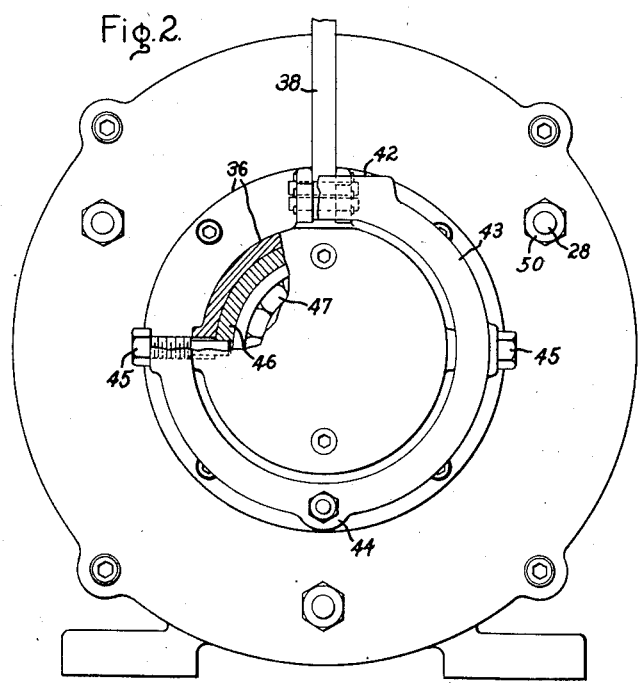
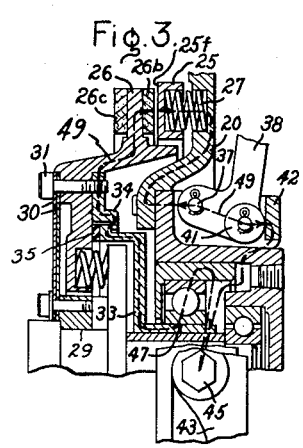
Inventors:
Irving Kalikow,
Lee E. Hildebrand,
Alan F. Lukens,
by Ernest H. Britton
Their Attorney.

Patented July 21, 1953

2,646,519

UNITED STATES PATENT OFFICE 2,646,519

DYNAMOELECTRIC MACHINE CLUTCH AND BRAKE

Irving Kalikow, Swampscott, and Lee E. Hildebrand and Alan F. Lukens, Marblehead, Mass., assignors to General Electric Company, a corporation of New York Application September 30, 1950, Serial No. 187,808

6 Claims. (Cl. 310—76)

Our invention relates to dynamoelectric machine clutch and brake arrangements and has particular significance in connection with a loom motor clutch brake.

Heretofore it has, of course, been known to have a flywheel in conjunction with a driving motor to smooth out load fluctuations, and it has also been known to have flywheel and driving motor run continuously with a driven device connected thereto through a clutch or alternately stopped by a brake. This arrangement permits a loom or other driven device to be stopped and started rapidly and frequently while the motor runs continuously, but heretofore such arrangements have been rather massive and space-consuming and the clutch and brake arrangements have been subject to misalignment (especially with uneven wear of clutch and brake surfaces) and have required frequent and precise adjustment of clutch and brake parts.

In order to have a motor, flywheel, clutch, and brake in one unit of relatively short length, some prior art machines have been built "inside out," that is, with the rotor arranged outside of the stator, but such arrangements are not readily adaptable to standard manufacturing practices and they also result in larger frame diameter and higher cost. Furthermore, many prior art machines of this type have entailed the application of axial brake or clutch applying forces through movement of the main drive shaft with consequent thrust load upon the bearings causing excessive bearing wear. Also, since the output drive shafts include a pinion, this arrangement requires that the pinion slide across the face of a mating gear, and in case of pinion wear, this can cause a binding action.

It is an object of the present invention to provide simple and inexpensive means for overcoming the above-mentioned difficulties.

A further object of the present invention is to provide a flywheel, motor, clutch, and brake having a minimum of parts and with a relatively standard or inner motor rotor mounted directly on a portion of the flywheel.

A still further object of the present invention is to provide a combination motor, flywheel, clutch, and brake structure with an output shaft which can be quickly disengaged from the motor armature and flywheel and quickly stopped by the brake mechanism through a simple mechanical construction which is considerably less subject to misalignment and periodic adjustment than that of constructions heretofore employed, and which, moreover, does not impose any rotating axial thrust forces upon main bearing members during clutching action in which position the device operates for the greatest proportion of total operating time.

In the illustrated embodiment of our invention the means employed in this connection comprise a conventional dynamoelectric machine rotor core provided with an enlarged inner bore for mounting on an extension of a flywheel which in turn is mounted so as to form an outer quill shaft so supported on bearings that no thrust is carried by any relatively rotating bearing units during normal running. Within the bearings is an inner (or output) drive shaft journalled in a stationary housing, and at the end opposite the driving end this shaft carries an axially moveable brake wheel adapted to be moved inward against a surface of the flywheel for clutch action, or axially outward against a braking surface. The brake wheel is primarily supported on the output or drive shaft by one or more axially flexible but torsionally rigid annular diaphragms (of which two are shown in the illustrated embodiment) in order to eliminate driving spline wear or other sliding contact problems and so that the clutch release brake actuating mechanism may operate without binding despite uneven wear or misalignment of the several parts, while the brake wheel shaft attaching means itself is not subject to wear desipte large torsional force variations or actual reversals of torque flow.

Other objects and advantages will become apparent and our invention will be better understood from consideration of the following description taken in connection with the accompanying drawing in which Fig. 1 is a side elevational view, partly in section, of a motor, flywheel, clutch, and brake in accordance with the invention; Fig. 2 is an end view (partly broken away) of the device of Fig. 1; and Fig. 3 is a reproduction of a portion of Fig. 1 separately illustrated to show the direction of brake application thrust load.

Referring now to Fig. 1, we have shown an arrangement in which an outer frame 10 is adapted to hold a conventional dynamoelectric machine stator core portion 11 provided with a stator winding 12. Arranged to react electrodynamically with the stator core portion is a squirrel-cage type rotor 13 which is fan-equipped and conventional except that it is provided with an extra large inner bore 14. The motor is provided with a rather large flywheel 15 which may be an integral casting provided with a portion 16 of reduced diameter over which rotor 13 is secured as by a pressed fit between its inner bore 14 and flywheel portion 16. Flywheel 15, in turn, has an inner bore 17 forming a clearance with an inner drive shaft 18, of a diameter suitably large for the intended purposes and adapted to be connected to a driven device (not shown) which in this case may be presumed to be speed reduction gearing for a loom. The assembly of loom motor and flywheel (already described) and a clutch-brake (as hereinafter described) is provided with a housing comprising end flanges 19 and 20 in which the shaft 18 is journalled by means of anti-friction bearings 21 and 22, respectively. Flywheel 15 is properly proportioned with respect to other driven members such as rotor 13, shaft 18, and other rotating parts such as interposed gearing and parts of a driven loom, and this flywheel is supported on shaft 18 by a pair of bearings 23 and 24, respectively. At one end thereof the flywheel is provided with an annular machined facing 15f and axially spaced therefrom is a substantially stationary member comprising an annular ring 25 having an annular facing 25f axially opposed to facing 15f. Interposed between the opposed faces 15f and 25f is an annular brake wheel 26 which may conveniently be made of aluminum and provided with a brake facing 26b (for mating with 25f) and a clutch facing 26c (for mating with 15f) with facings 26b and 26c of asbestos, cork, or other brake material, cemented or otherwise secured to the brake wheel. As hereinafter explained, the brake wheel is arranged to be axially moveable to selectively secure either a braking, neutral or a clutch action but the amount of movement need be only very small, ten to thirty thousandths of an inch clearance sufficing for this purpose. As shown, ring 25 may be axially adjustable with respect to end housing 20 by being biased therefrom by a plurality of compression springs 27 and adjustably drawn thereto by a plurality of studs 28.

Solidly secured to the shaft 18 is a block 29 to which is bolted at least one flexible annular diaphragm although two such diaphragms 30 are shown in the drawing fastened at their outer peripheries as by bolts 31 to the brake wheel 26 and serving to mount the brake wheel so as to allow some axial movement thereof while at the same time it is held rigid torsionally with respect to the shaft 18. With respect to shaft 18 and block 29, the brake wheel is shown biased in one axial direction by a plurality of compression springs 32 (for clutch action), and adapted to be moved in the opposite axial direction (for braking action) by engagement of an axially slideable yoke member 33 with a hook 34 secured to the brake ring. To keep the parts from rattling and scraping (during clutch action), a ring of rubber 35 or other resilient material may be interposed between yoke 33 and brake wheel 26. It will be appreciated that in the construction shown, block 29, discs 30, brake wheel 26, springs 32, yoke member 33, hook 34, and resilient ring 35 all rotate with the output drive shaft 18, although all of these members except block 29 (and one end of discs 30 and springs 32) are free to slide back and forth with respect to the shaft. End bracket 20 includes an end bearing cap 36 to which is pivotally secured as at 37 an operating lever 38 which is biased toward the machine by a tension spring 39 and adapted to be pushed in the opposite direction by a connecting rod 40 for operation of the clutch or brake as hereinafter explained. In conventional practice rod 40 may be moved to cause the brake action either manually or automatically responsive to one or more conditions such as power failure, warp stop motion, bang-off motion, filling motion or the like. Lever 38 is provided (at its end opposite spring 39 and rod 40) with one or more rollers 41 adapted to engage a flange 42 on an annular ring 43 (see Fig. 2) which is pivoted at its bottom 44 to the stationary end assembly of end bell 20 and end cap 36. In operation, when compression spring 39 pulls the upper end of lever 38 towards the motor, rollers 41 push part 42 of ring 43 axially outward with a high ratio of mechanical advantage. At diametrically opposite points, ring 43 is secured as by bolts 45 to an inner ring 46 to cause the latter to slide in an axial direction. At points where the bolts 45 pass through the end cap 36, the end cap is slotted (as shown dotted in Fig. 1) to provide a clearance for the sliding action. Inner ring 46 carries with it an additional bearing 47, the inner race of which is solidly secured to the slideable yoke member 33, thereby to pull the brake wheel 26 away from the flywheel clutch facing 15f and up to the brake facing 25f. The opposite action takes place when a push on rod 40 overcomes the force of spring 39 to allow springs 32 to restore clutch action.

One advantage of the construction just described is that the drive shaft itself is the innermost member. Furthermore, none of the bearings (except bearing 23 and bearing 47, as hereinafter explained) are subjected to any end thrust during operation of the device. During clutch action the spring 32 created force path is as shown by the arrows on dashed line 48 (Fig. 1) from which it is seen that the only bearing which is thrust loaded is bearing 23. However, for the greater proportion of the time this bearing 23 is only statically loaded because there is no relative motion of inner (or output) shaft 18 and rotor 13 when the clutch is engaged. During braking action, the lever 38 created force path is as shown by the arrows on dashed line 49 (Fig. 3) from which it is seen that the only bearing which is thrust loaded is bearing 47. However, during such braking action, the inner and outer races of this bearing are not relatively rotating except for a very short period of time. Because of this feature and because the brake wheel rides on one or a plurality of thin flexible discs, no bearing will be ruined by binding and it is always simple to apply braking action to the device.

The brake clearance may be easily adjusted by manipulating nuts 50 provided on studs 28, and application of the force exerted through lever 38 may also be readily adjusted since lower part 44 (of ring 43) is spring biased outward by a compression spring 51, and this part may be drawn inward against the force of the spring by drawing up a nut 52 on a stud 53 passing through part 44 to a portion of housing 36.

There is thus provided a device of the character described capable of meeting the objects hereinabove set forth. Brake clearance is readily adjusted by stopping the motor and putting the operating lever in the "run" (i. e., clutch engaged) position. The braking plate holding nuts 50 are released so that the heavy springs 27 force the plate 25 against the rotatable brake lining 26b. The adjusting nuts 50 are then brought up fingertight and then each additionally given equal partial turn so that the plate is drawn back the amount of clearance that is desired.

The device is particularly well suited to drive looms (where power must flow into and out of the driving device and where there are tremendous variations in torque requirements occurring suddenly and very frequently, such as 200 times a minute). Heretofore clutches and brakes for such applications have been of heavy construction much more massive than that required for the present invention, and have required constant adjustment with the loom operators or "fixers" often spending 50% of their time around the loom in precise adjustment of the clutch and brake. The device of the invention by substantially eliminating sliding contact wear problems (common to spline drives, for example), and minimizing the overall dimensions of the required device, provides a dynamoelectric machine, flywheel, clutch, and brake in one unit assembly of relatively short length without thrust carried by any rotating bearing during normal running so that no serious bearing life problems are encountered, and without likelihood (during operation) of binding due to uneven wear or misalignment of the several parts. The flexible diaphragm rings allow free sliding with respect to the supporting shaft without binding but with accommodation to allow for uneven wear of clutch or brake surfaces and also free the device from heretofore encountered wear problems resulting from torsional vibrations.

While we have illustrated and described a particular embodiment of our invention, modifications thereof will occur to those skilled in the art. We desire it to be understood, therefore, that our invention is not to be limited to the particular arrangements disclosed and we intend in the appended claims to cover all modifications which do not depart from the spirit and scope of our invention.

What we claim as new and desire to secure by Letters Patent of the United States is:

1. A dynamoelectric machine clutch and brake device comprising a dynamoelectric machine, a rotatable member connected to be directly driven by said dynamoelectric machine and having a radially extending face, an outer housing for said device, a ring member having a radially extending face axially spaced from said rotatable member face and secured to said housing to be torsionally stationary with respect thereto, a drive shaft extending through said dynamoelectric machine and said rotatable member and loosely journalled therein and also journalled in said housing, a brake wheel having a clutch facing arranged adjacent said rotatable member face and having a brake facing arranged adjacent said ring member face, at least one flexible diaphragm member secured adjacent its outer periphery to said brake wheel and secured adjacent its inner periphery to be rotatable with said drive shaft for mounting said wheel rigid torsionally while movable axially with respect to said shaft, spring means for moving said brake wheel axially to engage one of said facings with one of said faces, hook means opposed by said spring means and for moving said wheel axially to engage the other of said facings with the other of said faces, and lever means for operating said hook means.

2. A motor clutch brake comprising an electric motor, an inertia member connected to be directly driven by said motor and having a radially extending clutch facing a brake member having a relatively stationary radially disposed brake facing arranged in axially opposed relation with respect to said clutch facing, a clutch-brake wheel interposed between said clutch facing and said brake facing, an axially stationary output drive shaft, axially resilient torsionally rigid disk means connected to drive said output drive shaft from said clutch-brake wheel, spring means biasing said wheel into engagement with said clutch facing to drivingly connect said driven shaft to said inertia member, and lever means connected to move said wheel axially in opposition to said biasing means to cause said wheel to disengage said clutch facing and to engage said brake facing whereby said driven shaft is adapted to be quickly started and stopped while said inertia member remains in motion.

3. In the combination of a motor, flywheel, clutch, brake, and axially stationary output drive shaft adapted to be started by clutching action with said flywheel and stopped by brake action with a relatively stationary member, a brake wheel primarily supported on said output drive shaft by axially flexible but torsionally rigid means, said brake wheel being interposed axially between said flywheel and said stationary member and having on one face thereof a clutch facing and on an opposed face thereof a brake facing with said clutch facing arranged to engage said flywheel and said brake facing arranged to engage said relatively stationary member, spring means biasing said brake wheel into engagement with said clutch facing and hook and lever means comprising a plurality of axially shiftable relatively rotatable parts for causing axial motion of said brake wheel with respect to said output drive shaft to selectively cause said braking or clutch action, whereby said mechanism may operate without binding despite uneven wear or misalignment of the several parts.

4. A motor clutch brake device comprising a stationary housing, an output drive shaft journalled in said housing, a flywheel separately journalled on said drive shaft within said housing, a dynamoelectric machine rotor member secured to said flywheel to be rotatable therewith, a dynamolectric machine stator member secured to said housing and arranged to react with said rotor member, a ring member having a braking surface and arranged to be axially adjustable with respect to said stationary housing, a brake wheel interposed between said ring member and said flywheel, flexible diaphragm means for mounting said brake wheel to be torsionally rigid while axially movable with respect to said output drive shaft, said brake wheel having oppositely disposed radially extending clutch and brake facings for selectively engaging said axially adjustable brake member or said rotatable flywheel, means rotatable with said output shaft and arranged to axially move said brake wheel, and means associated with said stationary housing for axially moving said last-mentioned means, whereby the clutch brake actuating mechanism provided for said device may operate without axial movement of said output drive shaft and without binding despite uneven wear of clutch or brake surfaces.

5. A combination dynamoelectric machine, clutch, and brake comprising an outer housing, an output drive shaft journalled in said housing, a flywheel member journalled on said output drive shaft, a dynamoelectric machine rotor portion mounted on said flywheel, a dynamoelectric machine stator portion secured to said housing and arranged to react electrodynamically with said rotor portion to drive said rotor portion and said flywheel, said flywheel having an annular clutch facing at the end thereof opposite said dynamoelectric machine portions, a torsionally stationary axially adjustable member mounted on said stationary member and provided with an annular face axially disposed from said annular face on said flywheel, a brake wheel interposed between said flywheel annular face and said torsionally stationary member annular face, torsionally rigid and axially flexible means including at least one flexible diaphragm interconnecting said brake wheel and said output shaft for causing said output shaft to rotate with said brake wheel, and spring opposed lever means for axially moving said brake wheel with respect to said shaft to selectively engage said annular facing on said flywheel or said annular facing on said torsionally stationary member.

6. The combination of an outer frame, a dynamoelectric machine stator portion supported within said frame, a dynamoelectric machine rotor portion arranged to react electrodynamically with said stator portion and provided with a large inner bore, a flywheel having a large mass extending axially of said rotor portion and having a section of reduced diameter entering into and secured in said rotor inner bore, an output drive shaft journalled in said outer frame, bearing means for rotatably mounting said flywheel on said outer drive shaft, a stationary brake ring axially disposed from one end of said flywheel, a rotatable clutch brake ring interposed between said flywheel and said stationary brake ring, means including at least one torsionally rigid axially flexible disk diaphragm for interconnecting said clutch brake wheel and said shaft, hook means rotatable with said brake wheel for causing axial movement thereof to engage said stationary brake ring for braking action of said drive shaft, resilient spring means opposing said hook means for normally urging said brake wheel into engagement with said flywheel for clutch action to drive said output shaft, and torsionally stationary lever means for moving said rotatable hook means to overcome said clutch action and cause said braking action.

IRVING KALIKOW.
LEE E. HILDEBRAND.
ALAN F. LUKENS.

References Cited in the file of this patent

UNITED STATES PATENTS

| Number | Name | Date |
|---|---|---|
| 1,235,896 | Herreshoff | Aug. 7, 1917 |
| 1,638,949 | McCarty | Aug. 16, 1927 |
| 1,652,492 | Naul | Dec. 13, 1927 |
| 1,932,970 | Howe | Oct. 31, 1933 |
| 2,104,259 | Kales | Jan. 4, 1938 |
| 2,462,657 | McNairy | Feb. 22, 1949 |
| 2,481,867 | Peterson | Sept. 13, 1949 |

FOREIGN PATENTS

| Number | Country | Date |
|---|---|---|
| 701,305 | Germany | Jan. 13, 1941 |